(12) United States Patent
Sundararaj et al.

(10) Patent No.: US 11,979,203 B2
(45) Date of Patent: May 7, 2024

(54) LINEAR INDUCTION MOTOR EXCITATION MODULATION BASED COMMUNICATION

(71) Applicant: Rockwell Collins, Inc., Cedar Rapids, IA (US)

(72) Inventors: Laveen Vikram Sundararaj, Telangana (IN); Sheetal Kumar, Himachal Pradesh (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 377 days.

(21) Appl. No.: 17/375,503

(22) Filed: Jul. 14, 2021

(65) Prior Publication Data
US 2022/0368378 A1    Nov. 17, 2022

(30) Foreign Application Priority Data
May 12, 2021   (IN) .............................. 202141021514

(51) Int. Cl.
*H04B 7/01* (2006.01)
*B61L 3/22* (2006.01)
(Continued)

(52) U.S. Cl.
CPC .............. *H04B 7/01* (2013.01); *B61L 3/227* (2013.01); *B61L 3/24* (2013.01); *B61L 3/243* (2013.01);
(Continued)

(58) Field of Classification Search
CPC .. B61L 15/0018; B61L 15/0027; B61L 27/40; B61L 27/70; B61L 2210/04;
(Continued)

(56) References Cited

U.S. PATENT DOCUMENTS

| 2,685,068 A | 7/1954 | Goubau |
| 3,263,173 A * | 7/1966 | Collins, Jr. .............. H04B 7/01 455/75 |

(Continued)

FOREIGN PATENT DOCUMENTS

| CN | 1282309 C | * 10/2006 |
| CN | 1282309 C | 10/2006 |

(Continued)

OTHER PUBLICATIONS

Search Report in United Kingdom Application No. GB2110824.6 dated May 13, 2022, 3 pages.
(Continued)

*Primary Examiner* — S. Joseph Morano
*Assistant Examiner* — James William Jones
(74) *Attorney, Agent, or Firm* — Suiter Swantz IP

(57) ABSTRACT

A set of stators of a linear induction motor are mounted on a track. A three-phase current is provided to each of the stators, such that a traveling magnetic field (TMF) is created by the stators along the length of the track. The traveling magnetic field includes a magnetic flux corresponding to a stator excitation modulated with a message signal. A rotor includes a series of conductor plates. As the traveling magnetic field passes through the conductor plates, a current is induced in the plates by induction. Such current then generates an opposing magnetic field causing the plates and the vehicle to be propelled. Each phase may first be modulated with a message signal, before being provided to the stator. The current at the rotor is then demodulated to realize the message signal. A doppler shift due to the speed of the rotor relative to the stator is corrected.

20 Claims, 6 Drawing Sheets

(51) Int. Cl.
  *B61L 3/24* (2006.01)
  *B61L 15/00* (2006.01)
  *B61L 27/40* (2022.01)
  *B61L 27/70* (2022.01)
  *G08C 17/04* (2006.01)
  *B61L 13/04* (2006.01)

(52) U.S. Cl.
  CPC ........... *B61L 3/246* (2013.01); *B61L 15/0018* (2013.01); *B61L 15/0027* (2013.01); *B61L 27/40* (2022.01); *B61L 27/70* (2022.01); *G08C 17/04* (2013.01); *B61L 3/222* (2013.01); *B61L 13/047* (2013.01)

(58) Field of Classification Search
  CPC .... B61L 3/12; B61L 3/126; B61L 3/22; B61L 3/221; B61L 3/225; B61L 3/227; B61L 3/24; B61L 3/243; B61L 3/246; B61L 3/047; B61L 2003/122; B61L 2003/123; B61L 2003/223; B61L 2003/226; B61L 2003/228; B60L 2240/12; B60L 13/10; H04B 7/01; G08C 17/04
  USPC ....... 104/292, 281, 282, 283, 284, 285, 286, 104/290
  See application file for complete search history.

(56) References Cited

U.S. PATENT DOCUMENTS

| | | | | |
|---|---|---|---|---|
| 5,063,387 | A * | 11/1991 | Mower | H04B 7/01 455/260 |
| 6,011,508 | A | 1/2000 | Perreault et al. | |
| 6,499,701 | B1 | 12/2002 | Thornton et al. | |
| 7,352,929 | B2 | 4/2008 | Hagen et al. | |
| 7,432,622 | B2 * | 10/2008 | Griepentrog | H01F 38/18 310/179 |
| 8,044,822 | B2 | 10/2011 | Hoerl et al. | |
| 8,599,956 | B1 * | 12/2013 | Mitchell | H04W 56/0035 375/285 |
| 9,324,230 | B2 * | 4/2016 | Chutorash | G08C 17/04 |
| 9,610,509 | B2 * | 4/2017 | Vance | H02K 11/215 |
| 9,692,501 | B1 | 6/2017 | Mitchell et al. | |
| 9,764,648 | B2 | 9/2017 | Finodeyev et al. | |
| 9,998,173 | B2 | 6/2018 | Bonicatto et al. | |
| 2001/0054849 | A1 * | 12/2001 | Rybak | B60L 15/20 310/12.22 |
| 2007/0155333 | A1 * | 7/2007 | Banniza | H04W 56/0035 455/67.11 |
| 2013/0069834 | A1 * | 3/2013 | Duerksen | H04B 7/01 343/711 |
| 2013/0277974 | A1 * | 10/2013 | Klatt | F16H 7/023 474/148 |
| 2017/0126163 | A1 | 5/2017 | Liang | |
| 2017/0208600 | A1 * | 7/2017 | Hsu | H04B 7/01 |
| 2021/0235342 | A1 * | 7/2021 | Zhu | H04B 7/01 |

FOREIGN PATENT DOCUMENTS

| | | |
|---|---|---|
| CN | 107994954 A * | 5/2018 |
| CN | 111884685 A * | 11/2020 |
| DE | 102007001479 A1 | 7/2008 |
| EP | 0718986 A2 * | 6/1996 |
| EP | 3042824 A1 * | 7/2016 |
| FR | 2428821 A1 * | 1/1980 |
| GB | 1398771 A | 6/1975 |
| GB | 2571068 A | 8/2019 |
| KR | 20180062433 A * | 6/2018 |
| WO | WO-2020091921 A1 * | 5/2020 |

OTHER PUBLICATIONS

S. Braccini et al., "A discrete resampling technique to correct for Doppler effect in continuous gravitational wave search", 2010 J. Phys. Conf. Ser. 243 012009, 10 pages.

Tracey M. Clark, "Position Sensing and Control of a Linear Synchronous Motor", May 26, 1995, Thesis, Massachusetts Institute of Technology, 159 pages.

* cited by examiner

LINEAR INDUCTION MOTOR EXCITATION MODULATION BASED COMMUNICATION

CROSS-REFERENCE TO RELATED APPLICATIONS

The present application claims the benefit of India Provisional Patent Application 202141021514, filed May 12, 2021, titled LINEAR INDUCTION MOTOR EXCITATION MODULATION BASED COMMUNICATION, naming Laveen Vikram Sundararaj and Sheetal Kumar as inventors, which is incorporated herein by reference in the entirety.

BACKGROUND

Magnetic levitation (maglev) transportation involves a series of linear induction motors which repel a vehicle from a surface of a track and propel the vehicle in a direction. Linear induction motors (LIM) include an asynchronous motor which produces linear motion by magnetic induction. The stator is excited by a poly-phase excitation to achieve locomotion. Maglev transportation vehicle includes hyperloop pods. The pods have the linear Rotor underneath wherein EMF (eddy current) is induced by the Stator that results in motor action and hence locomotion.

Existing communication standards, such as 5G (fifth generation technology standard for broadband cellular networks), Li-Fi (Light Fidelity), and Ethernet may require infrastructure, line-of-sight, or spooling to enable communication with the maglev or vactrain (vacuum tube trains) transport vehicle. A subset of maglev train transportation may include vactrains. These vactrains may travel in an evacuated or partially evacuated tubes and may be suspended by magnetic levitation. These vactrains may travel at speeds exceeding many conventional transportations means. Due to the high speeds, communication with the vactrain may be limited.

Therefore, it would be advantageous to provide a device, system, and method that mitigates the shortcomings described above.

SUMMARY

Ground stations send command, control or other messages via linear stators of the Linear Induction Motors (LIM) to mobile rotors that travel along long distances over confined spaces. Induction Motor Excitation modulation-based communication enables communication with the pods (vehicle). In addition to locomotion, communication is achieved by modulating the Stator excitation with a message signal. Linear induction motors used in maglev transportation, such as vactrains, may communicate messages between a ground station and a maglev vehicle by stationary linear stators and mobile rotors onboard the maglev vehicle. The ground station may modulate the power excitation of the stator with a message, such that the stator generates a traveling magnetic field based on the modulated power excitation. The traveling magnetic field may interact with the rotor of the vehicle to generate an eddy current. The eddy current may then be demodulated for receiving the message signal.

A transportation system is disclosed in accordance with one or more embodiments of the present disclosure. In one embodiment, the transportation system includes a ground station configured to modulate a first-phase of a three-phase stator excitation with an unmodulated message signal to create a modulated stator excitation. In another embodiment, the transportation system includes a stator coupled to the ground station. In another embodiment, the stator includes a coil assembly. In another embodiment, the coil assembly of the stator is configured to receive the modulated stator excitation from the ground station by the coupling. In another embodiment, the stator coil assembly generates a travelling magnetic field in response to receiving the modulated stator excitation. In another embodiment, the transportation system includes a vehicle including a rotor. In another embodiment, an eddy current is induced by the rotor in response to the travelling magnetic field generated by the stator. In another embodiment, the eddy current corresponds to the modulated stator excitation. In another embodiment, the eddy current induces a secondary magnetic field opposing the traveling magnetic field. In another embodiment, the secondary magnetic field generates a force causing the rotor and the vehicle to translate relative to the stator. In another embodiment, the vehicle is configured to determine a demodulated message signal corresponding to the unmodulated message signal based on the eddy current.

A method of communicating from a ground station to a vehicle is disclosed, in accordance with one or more embodiments of the present disclosure. In one embodiment, the method includes modulating a first-phase of a three-phase stator excitation with an unmodulated message signal to create a modulated stator excitation. In another embodiment, the method includes providing the modulated stator excitation to a coil assembly of a stator. In another embodiment, the method includes generating, by the coil assembly, a travelling magnetic field in response to receiving the modulated stator excitation. In another embodiment, the method includes inducing an eddy current in a rotor coupled to a vehicle in response to the travelling magnetic field. In another embodiment, the eddy current corresponds to the modulated stator excitation. In another embodiment, the method includes inducing a secondary magnetic field opposing the traveling magnetic field by the eddy current. In another embodiment, the secondary magnetic field causes the rotor and the vehicle to translate relative to the stator. In another embodiment, the method includes determining a demodulated message signal corresponding to the unmodulated message signal based on the eddy current by at least one of an analog filter or a digital filter. In another embodiment, the method includes correcting for a doppler shift of the travelling magnetic field due to a speed of the vehicle relative to the stator.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
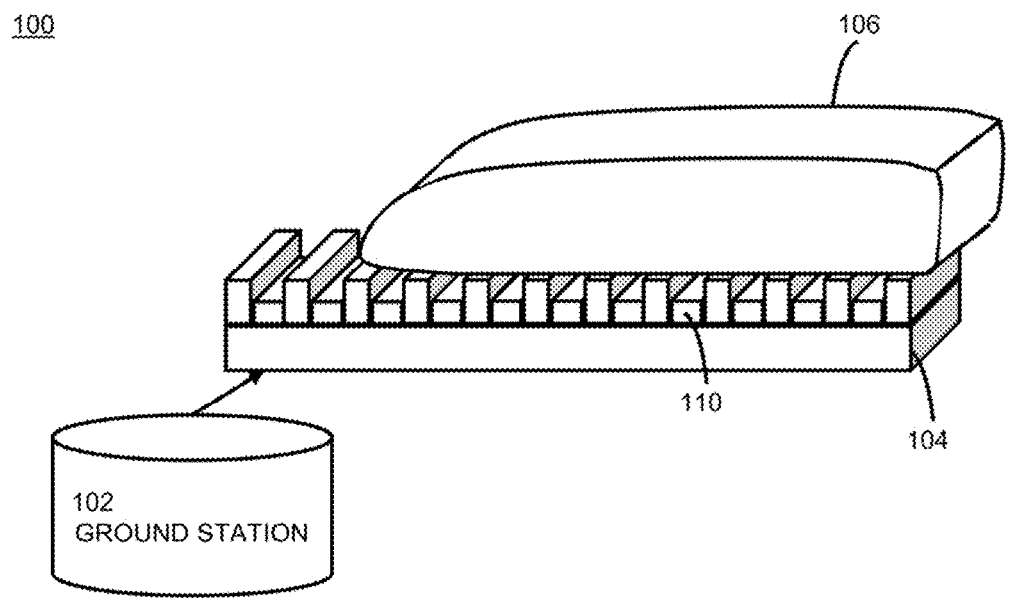
FIG. 1A depicts a transportation system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. A linear induction motor may include continuously staggered stators defining a track on which a vehicle will travel. The stators may be power modulated so that magnetic field sweeps across the rotor (in the vehicle) and provides a drive motor action. In embodiments, a modulated stator excitation is provided to the stator, such that the stator generates a magnetic field for communicating a message signal with the vehicle.

Figure 1B:
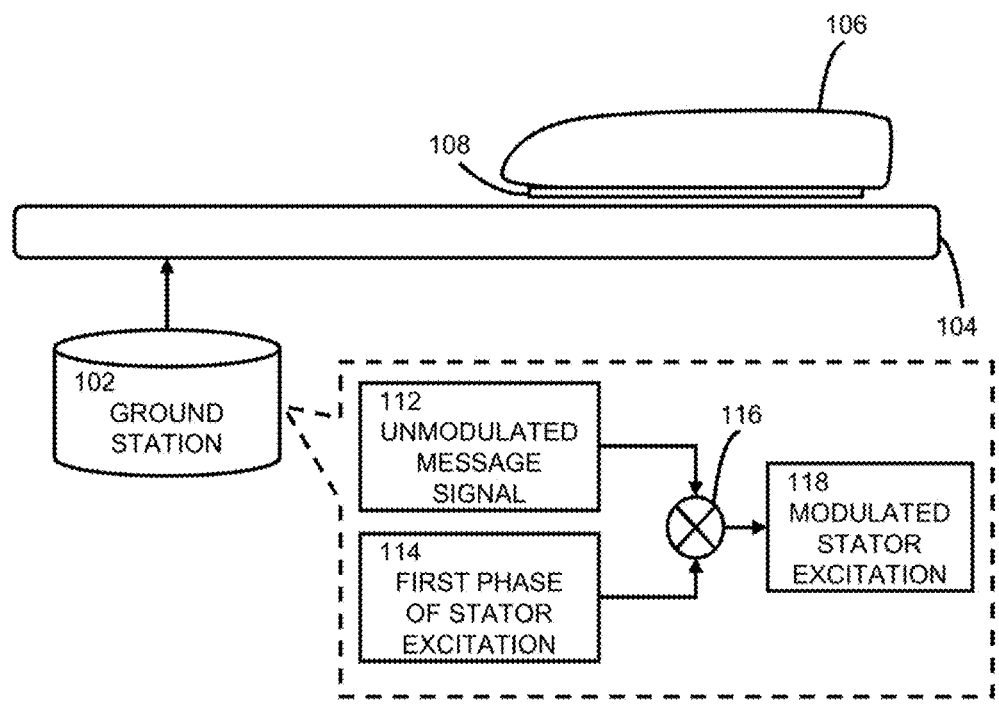
FIG. 1B depicts a simplified diagram of a ground station modulating a first phase of a stator excitation with an unmodulated message signal, in accordance with one or more embodiments of the present disclosure.
Figure 1C:
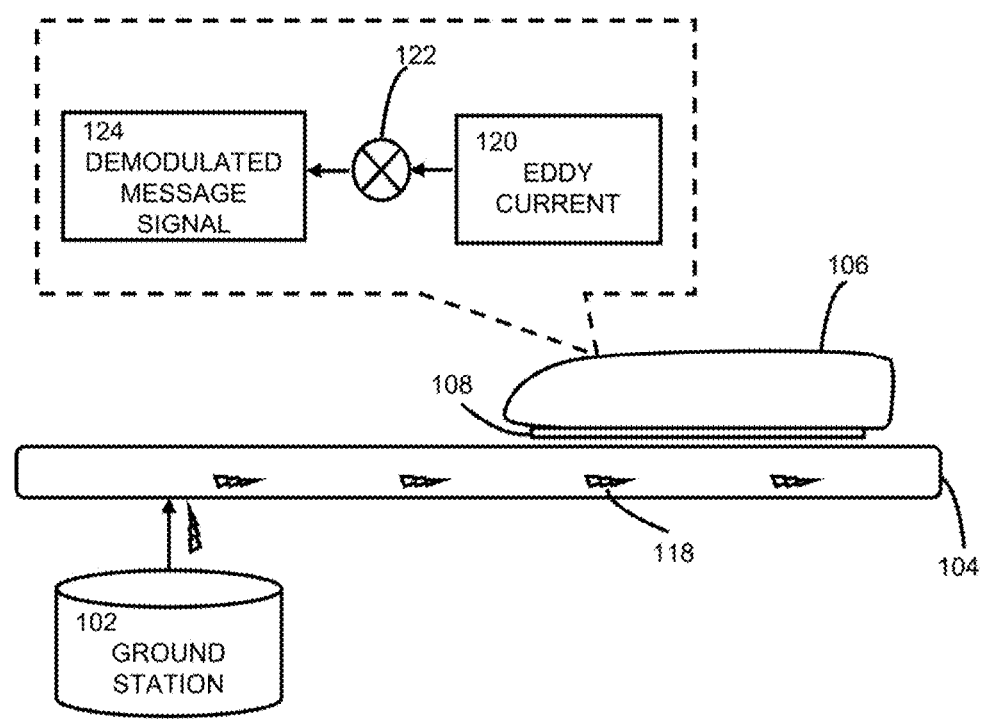
FIG. 1C depicts a simplified diagram of a vehicle determining a demodulated message signal, in accordance with one or more embodiments of the present disclosure.

Referring now to FIGS. 1A-1C, a transportation system 100 is described, in accordance with one or more embodiments of the present disclosure. The transportation system 100 may include one or more ground stations 102. The transportation system 100 may also include one or more stators 104. The transportation system 100 may also include a vehicle 106. The vehicle 106 may include one or more rotors 108. The transportation system 100 may translate the vehicle 106 along a pathway defined by the stator 104. In embodiments, the transportation system 100 is also configured to communicate signals to the vehicle 106 by the stator 104. The vehicle 106 may include any magnetic levitation vehicle, such as, but not limited to, a shuttle, a maglev train car, or a vactrain pod.

Figure 2A:
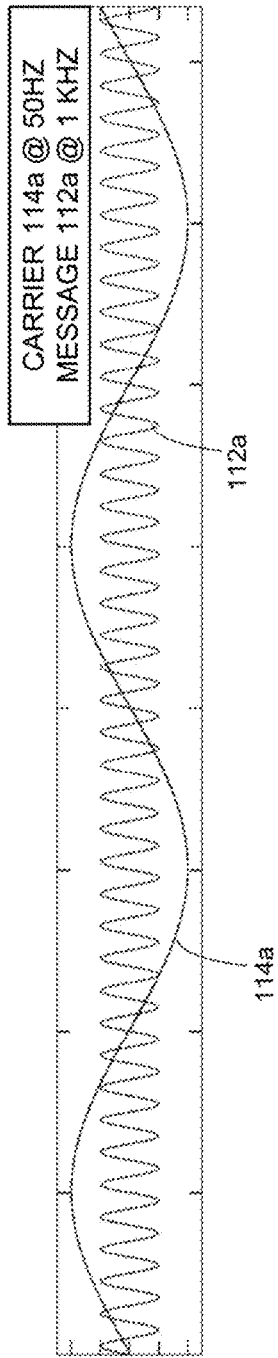
FIG. 2A depicts an unmodulated message signal and a first phase of stator excitation, in accordance with one or more embodiments of the present disclosure.
Figure 2B:
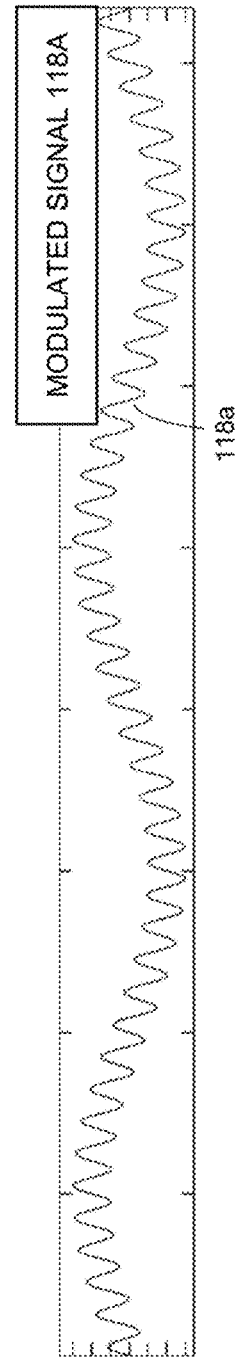
FIG. 2B depicts a phase of modulated stator excitation, in accordance with one or more embodiments of the present disclosure.

The ground station 102 may provide one or more phases of excitation (e.g., a first phase of stator excitation 114) to the stator for translating the vehicle 106. The ground station 102 may also include an unmodulated message signal 112, to be communicated to the vehicle 106. In embodiments, the ground station 102 is configured to modulate 116 the first phase of a stator excitation 114 with the unmodulated message signal 112. The unmodulated message signal 112 may include a waveform representative of digital data. The unmodulated message signal 112 may include a frequency between 750 Hz and 1000 Hz. For example, FIG. 2A depicts the unmodulated message signal 112a at 1000 Hz. The first phase of the unmodulated stator excitation 114 may be modulated 116 with the unmodulated message signal 112 by any suitable technique, such as, but not limited to, amplitude modulation, frequency modulation, or shift keying. The ground station may modulate 116 the first phase of the stator excitation 114 with the unmodulated message signal 112 by induction, such as, but not limited to, by one or more transformers. The ground station may modulate 116 the first phase of the stator excitation 114 with the unmodulated message signal 112 by semiconductor devices, such as, but not limited to a metal—oxide—semiconductor field-effect transistor (MOSFET). Thus, the modulated stator excitation 118 may carry both the first phase of the stator excitation and the message signal. By the modulation 116, the ground station 102 may create a modulated stator excitation 118 (see FIG. 1B). The modulated stator excitation 118 may include a first phase which is modulated with the message signal, a second phase which is unmodulated, and a third phase which is unmodulated. For example, FIG. 2B depicts a phase of modulated stator excitation 118a. In further embodiments, the ground station 102 may modulate the second or the third phases with additional message signals. In embodiments, the ground station 102 is further configured to modulate each phase of the stator excitation. In a multi-phase stator excitation, a corresponding modulation of all phases results in increased bandwidth. A corresponding modulation of additional phases may result in increased bandwidth. Thus, poly-phase excitation may be used advantageously to realize an expanded bandwidth. The different phases could be used to encode different message signals that could be used by individual Pods or in combination for a bigger data payload. The ground station 102 may further modulate a second-phase of the three-phase stator excitation with a second message signal for increasing a communication bandwidth to the vehicle. However, where the first phase of the three-phase excitation is modulated with a message signal, the eddy current may include noise induced in the second and third phases. Similarly, excitation modulation within the second and third phases may further produce noise in the other channels.

The ground station 102 may then provide the modulated stator excitation 118 to the stator 104 (see FIG. 1C). In embodiments, the stator 104 may be coupled to the ground station 102 by an electrical communication interface, such as, but not limited to, a wire (e.g., copper, etc.) or a cable. Thus, the stator 104 may receive stator excitation from the ground station 102. The stator 104 may also include a coil assembly 110. For example, the coil assembly 110 may include a three-phase winding of coils. Each phase of the three-phase winding may include a material which generates a magnetic field in response to an electrical excitation. For example, the first-phase of the three-phase winding may receive the modulated first phase of the modulated stator excitation 118, the second-phase of the three-phase winding may receive the modulated second phase of the modulated stator excitation 118, and the third-phase of the three-phase winding may receive the modulated third phase of the modulated stator excitation 118. In this regard, when the coil assembly 110 receives three-phase excitation power, the coil assembly 110 may generate travelling magnetic fields. The traveling magnetic fields may be a primary cause in generating driving thrust from (induction) motor action for propulsion of the vehicle 106. The portion of the travelling magnetic field generated by the first-phase of the three-phase winding may correspond, at least in part, to the unmodulated message signal 112 which has modulated the first phase of stator excitation 114. As may be understood, the three-phase excitation power may include an alternating current for generating the travelling magnetic field. Each phase of the three-phase excitation power may include a frequency of 50 Hz. For example, FIG. 2A depicts the first phase of the stator excitation 114a at 50 Hz. Similarly, the stator 104 may include any stator 104 known in the art, such as, but not limited to, a stator of a linear induction motor (LIM).

The traveling magnetic field generated by the stator 104 may induce an eddy current 120 by the rotor 108. The magnetic field induces the eddy current 120 according to faraday's law. The rotor 108 may include any rotor known in the art, such as, but not limited to, a rotor of a linear induction motor (LIM). For example, the rotor 108 may include a conductive plate or blade. The rotor 108 may be disposed on the vehicle 106 such that the rotor 108 provides propulsion for the vehicle 106 in response to the traveling magnetic field, such as, but not limited to, an underside of the vehicle 106. In response to the eddy current 120 induced by the rotor 108, the rotor 108 may generate a secondary magnetic field, according to Lenz's law. The secondary magnetic field may repel the travelling magnetic field such that rotor 108 (and similar the vehicle 106 to which the rotor 108 is coupled) translates along the stator 104.

Figure 2C:
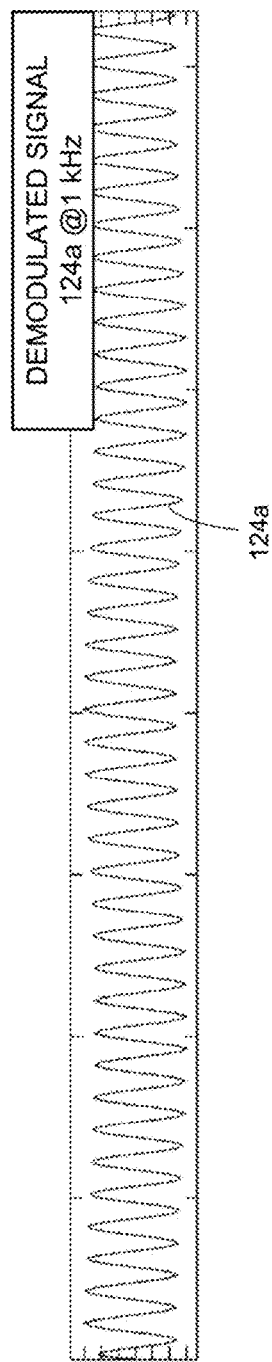
FIG. 2C depicts a demodulated message, in accordance with one or more embodiments of the present disclosure.

In embodiments, the eddy current 120 includes electrical current which is a function of the modulated stator excitation 118. In this regard, the travelling magnetic field may include a magnetic flux which is related to the modulated stator excitation 118 (e.g., both the message 112 and the first phase of the stator excitation 114). The characteristics of the eddy current 120 corresponds to such magnetic flux. By sensing the eddy current 120 or the secondary magnetic field of the rotor 108, and demodulating 122 the sensed eddy current 120 or the secondary magnetic field, a demodulated message signal 124 may be determined by the vehicle 106. The demodulated message signal 124 may correspond to the unmodulated message signal 112. In this regard, the frequency of the unmodulated message signal 112 may be between 750 Hz and 1000 Hz and the frequency of the demodulated message signal 124 may be between 750 Hz and 1000 Hz. For example, FIG. 2C depicts the demodulated message signal 124a at 1000 Hz.

The vehicle 106 may determine the demodulated message signal 124 based on the eddy current 120 by any suitable means, such as, but not limited to, an analog filter or a digital filter. The analog filter or digital filter may include any filter such as, but not limited to, a band-pass filter (BPF) or a high-pass filter (HPF). A level shifter may limit the tapped induced EMF (eddy current) and hence demodulate the same using a low pass filter (for selection) or a high pass filter (for elimination). A band stop filter may remove the phase excitation wave form and retain the message signal. For example, the induced eddy current may be measured by a sensor (e.g., an eddy current sensor) of the vehicle 106. The measured eddy current may be provided to a digital filter for demodulating the message signal frequencies from the modulated stator excitation phases. By digital signal processing, an appropriate detection and filtering may be performed using signal processing algorithm or software, by a controller of the vehicle. A Phase locked loop (PLL) circuitry may also be used to detect and demodulate the signals at the rotor 108. By way of another example, the induced eddy current 120 may be filtered by an analog filter.

Induction based communication to the vehicle 106 may be prone to Doppler Shift. The vehicle 106 may be travelling in relation to the traveling magnetic field generated by the stator 104. The travelling magnetic field may undergo doppler shift, due to the relativistic doppler effect of magnetic fields caused by the relative movement between the source (i.e., the stator 104) and the observer (i.e., the rotor 108). In particular, the vehicle 106 may include a vactrain vehicle which may travel at hypersonic speeds (e.g., between Mach one to six, or greater). Such hypersonic speeds may lead to a shift in the frequency of the traveling magnetic field. Doppler Shifts in the frequency of the travelling magnetic field which are modulated with low bit rate message signals may be of relatively low concern, given the speed of the magnetic fields relative to the speed of the vehicle 106. However, modulation schemes yielding higher bit rates per second will be more sensitive to Doppler shifts. One or more of the ground station 102 or the vehicle 106 may account for such Doppler shifts by speed synchronization mechanisms.

In embodiments, the vehicle 106 may store data by a memory (not depicted). For example, the data stored may include the sensed eddy current 120 or various velocity measurements. The data stored in the memory may then be forwarded to the ground station 102. For example, the vehicle may transmit the data by a signal transmitted over a radio frequency to the ground station 102. By way of another example, the data may be forwarded to other vehicles, checkpoints, or guide rails within range and subsequently be transferred to the ground station 102.

The vehicle 106 may thus be configured to transmit the demodulated message signal 124 to the ground station 102. For example, the vehicle 106 may transmit the demodulated message signal 124 to the ground station by a radio frequency (RF) communication. The ground station 102 may then compare the demodulated message signal 124 with the unmodulated message signal 112. For example, the ground station 102 may compare the observed frequency of the demodulated message signal 124 with the expected frequency. Based on the comparison, the ground station 102 may modulate subsequent unmodulated message signals 112 to correct for the doppler shift.

The ground station 102 may also receive a signal indicative of the speed of the vehicle 106 relative to the stator 104, and based on the speed, correct for signal transmission frequency or phase changes. The velocity of the rotor relative to the stator may be determined by any suitable means. For example, the speed of the vehicle 106 may be determined using sensors such as accelerometers on the vehicle 106. The accelerometers may determine when the speed/acceleration of Pod changes between stages (e.g., Stationary, Accelerating, Cruise, Decelerating). By way of another example, a location of the stator over time may be determined by a global navigation satellite system (GNSS), with such locations used to determine a velocity measurement. By way of another example, the transportation system 100 may further include one or more radar detection system. Thus, the speed of the rotor 108 may be determined. The ground station 102 may then determine a ratio of the speed of the rotor 108 relative to the speed of travelling magnetic field (e.g., by a controller of the ground station 102, including one or more processors configured to execute a set of program instructions maintained on a non-transitory memory medium). This ratio indicates the doppler frequency shift which the ground station 102 may then adjust for when modulating the stator excitation with the message signal. The ground station 102 may then modulate subsequent stator excitations to correct for the doppler shift based on the signal indicative of the speed. In embodiments, the ground station 102 is configured to dynamically switch between signals or channels based on the speed the vehicle 106.

In embodiments, multiple vehicles 106 may be disposed on a common stator. The ground station 102 may choose an appropriate frequency or phase band for communication that minimizes possible Doppler Effects for each of the vehicles 106. The ground station 102 may also coordinate between multiple vehicles 106 travelling at different speeds. In this regard, the ground station 102 may choose a frequency or Harmonic that works for vehicles 106 on the same track which are fed by a common ground station with message signal (that modulates the Stator excitation).

The vehicle 106 may also correct for the Doppler Shift. For example, the vehicle 106 may include a digital signal processor (DSP). By the DSP, the vehicle 106 may resample the demodulated message signal 124 with an average frequency corresponding to a phase modulated frequency of the first phase of stator excitation 114 to correct for the doppler shift of the travelling magnetic field. Resampling to correct for Doppler Shift is generally described in "A discrete resampling technique to correct for Doppler effect in continuous gravitational wave search", by S Braccine et al 2010 J. Phys. Conf. Ser. 243 012009, which is incorporated herein by reference in its entirety.

In embodiments, the transportation system 100 includes multiple ground stations 102. For example, the ground stations 102 may modulate phases of the stator excitation in tandem or in multiplex. The ground stations 102 may be communicatively coupled by a communication interface. By communicating, the ground stations 102 may share the unmodulated message signal 112. The ground stations 102 may then inverse multiplex a portion of the unmodulated message signal 112 between the ground station and the additional ground station, for improving a data rate of the signal. The ground stations 102 may then each communicate the inverse multiplexed portion of the unmodulated message signal 112 to the vehicle by a stator to which the ground station is coupled (e.g., by modulating a phase of the stator excitation with the unmodulated message signal, as previously discussed). In this regard, each ground station 102 may be coupled to a separate stator. For example, the transportation system 100 may include a dual-sided or a multisided stator rail. Dual side or multisided stator rails at certain intervals may also provide exclusive use for error detection and correction of communication. Such stators may be adjacently disposed with one another. In embodiments, the dual-sided stator rails are arranged in a staggered configuration, such that a first side (e.g., a left stator) may overlap with a first and a second stator on the second side.

In embodiments, the transportation system 100 further includes one or more additional rotors (not depicted). For example, a secondary rotor may be disposed along the stator 104 at a fixed distance from the ground station 102. The secondary rotor may be communicatively coupled with the ground station by a communication interface, such as, but not limited to a wireless communication. The travelling magnetic field generated by the stator 104 may induce an additional eddy current in the secondary rotor. The secondary rotor may then communicate a signal indicative of the eddy current induced in the secondary rotor to the ground station. Based on the signal, the ground station 102 may correct a power factor of the modulated stator excitation. The power factor corrections may be carried out for improving an efficiency of energy used for locomotion and communication. Similarly, the ground station 102 may correct for a modulation depth (i.e., a modulation index) of the modulated stator excitation. In this regard, the ground station 102 may correct for the modulation depth based on the modulation scheme in which the first phase of the stator excitation is modulated with the unmodulated message (e.g., amplitude modulation, frequency modulation, shift keying).

In embodiments, the vehicle 106 may act as a communication bridge for relaying at points of electrical, physical or mechanical isolation of the stator 104. In this regard, the transportation system 100 may include a stator which is electrically isolated from a second stator (e.g., in a dual stator configuration, a staggered stator configuration, a multi-stator configuration etc.). The second stator may generate a travelling wave for translating the vehicle and the rotor (e.g., by way of a second ground station) similar to the first stator. The vehicle 106 may also be configured to induce an eddy current in the second stator to repeat a message from the first stator. For example, the vehicle 106 may induce the eddy current by a power rotor (not depicted) of the vehicle. In this regard, the vehicle 106 may include a power source coupled to the rotor by which the vehicle 106 may modulate the rotor for inducing an eddy current in the second stator. Thus, an ability for limited role reversal between stator and rotors may exist for retransmission of signals as a relay to enhance range.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

Figure 3:
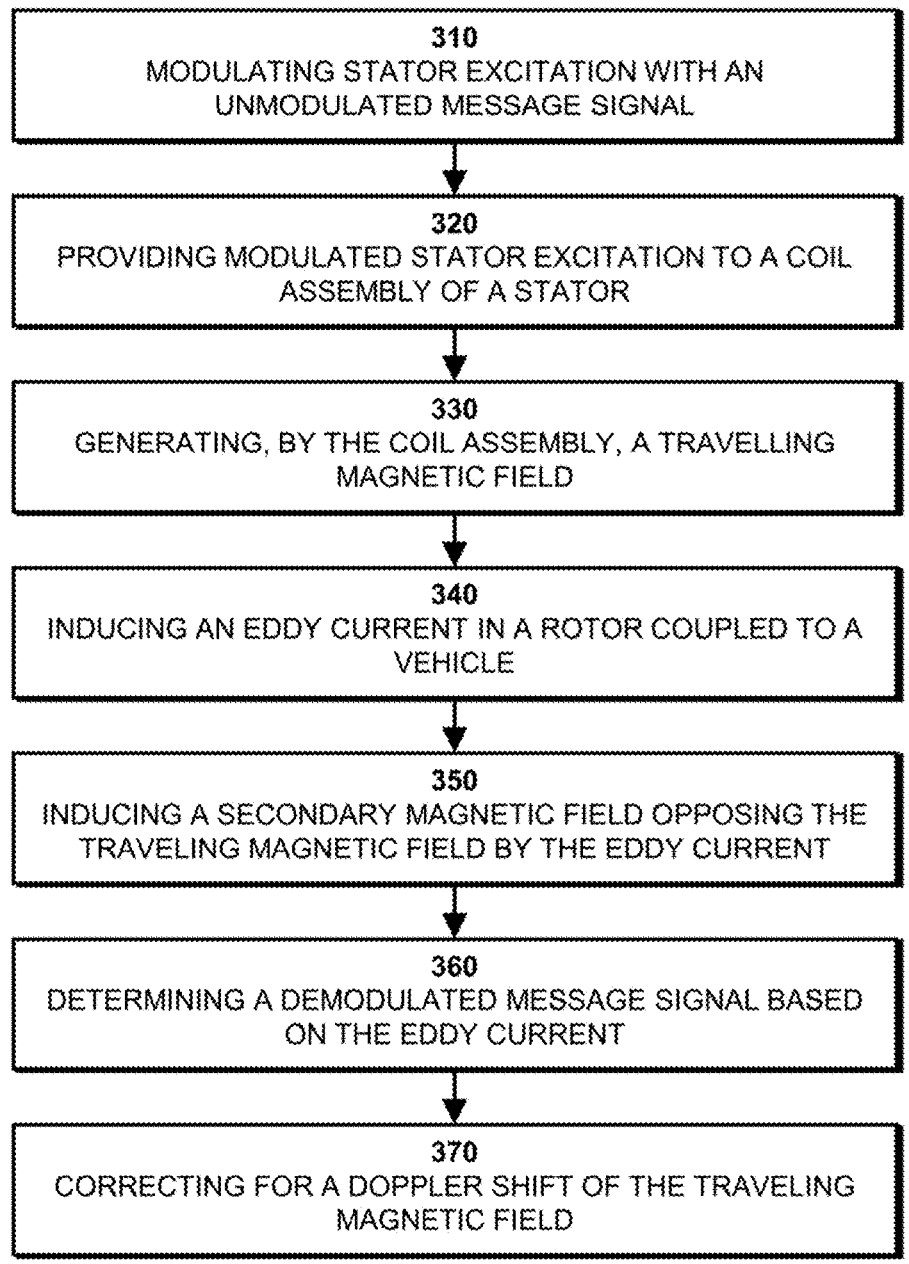
FIG. 3 depicts a flow diagram of a method, in accordance with one or more embodiments of the present disclosure.

Referring now to FIG. 3, a method 300 is described, in accordance with one or more embodiments of the present disclosure. By the method 300, a ground station may communicate to a vehicle. The embodiments and the enabling technologies described previously herein in the context of the transportation system 100 should be interpreted to extend to the method 300. It is further recognized, however, that the method 300 is not limited to the transportation system 100.

In a step 310, stator excitation is modulated with an unmodulated message signal. In this regard, a first-phase of a three-phase stator excitation is modulated with the unmodulated message signal to create a modulated stator excitation. The modulated stator excitation may be created by a ground station.

In a step 320, the modulated stator excitation is provided to a coil assembly of a stator.

In a step 330, the coil assembly generates a travelling magnetic field. The travelling magnetic field may be generated in response to receiving the modulated stator excitation.

In a step 340, an eddy current is induced in a rotor coupled to a vehicle in response to the travelling magnetic field. The eddy current may correspond to the modulated stator excitation.

In a step 350, a secondary magnetic field is induced opposing the traveling magnetic field by the eddy current. The secondary magnetic field may cause the rotor and the vehicle to translate relative to the stator.

In a step 360, a demodulated message signal is determined. The demodulated message signal may correspond to the unmodulated message signal. To determine the demodulated message signal, the eddy current is demodulated. The demodulated message signal may be determined by demodulating the eddy current by at least one of an analog filter or a digital filter.

In a step 370, a doppler shift of the travelling magnetic field due to a speed of the vehicle relative to the stator is corrected. For example, correcting for the Doppler shift may include comparing the demodulated message signal with the unmodulated message signal and modulating subsequent stator excitations to correct for the Doppler shift based on the comparison. By way of another example, correcting for the Doppler shift may include receiving a signal indicative of the speed of the vehicle relative to the stator and modulating subsequent stator excitation to correct for the Doppler shift based on the signal indicative of the speed. By way of another example, correcting for the Doppler shift may include resampling the demodulated message signal with an average frequency corresponding to a phase modulated frequency of the stator excitation to correct for the Doppler shift of the travelling magnetic field.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is to be noted that the specific order of steps in the foregoing disclosed methods are examples of exemplary approaches. Based upon design preferences, it is understood that the specific order of steps in the method can be rearranged while remaining within the scope of the present disclosure. It is believed that the present invention and many of its attendant advantages will be understood by the foregoing description. It is also believed that it will be apparent that various changes may be made in the form, construction, and arrangement of the components thereof without departing from the scope and spirit of the present disclosure. The form herein described being an explanatory embodiment thereof.

What is claimed:

1. A transportation system comprising:
   a ground station configured to modulate an unmodulated message signal with a first-phase of a three-phase stator excitation to create a modulated stator excitation;
   a stator coupled to the ground station, the stator including a coil assembly, wherein the coil assembly of the stator is configured to receive the modulated stator excitation from the ground station by the coupling, wherein the coil assembly generates a travelling magnetic field in response to receiving the modulated stator excitation;
   a vehicle including a rotor, wherein an eddy current is induced by the rotor in response to the travelling magnetic field, wherein the eddy current corresponds to the modulated stator excitation, wherein the eddy current induces a secondary magnetic field opposing the traveling magnetic field, the secondary magnetic field causing the rotor and the vehicle to translate relative to the stator, wherein the vehicle is configured to determine a demodulated message signal corresponding to the unmodulated message signal based on the eddy current.

2. The transportation system of claim 1, wherein at least one of the ground station or the vehicle is configured to correct for a doppler shift of the travelling magnetic field due to a speed of the vehicle relative to the stator.

3. The transportation system of claim 2, wherein the vehicle is configured to transmit the demodulated message signal to the ground station, wherein the ground station is configured to compare the demodulated message signal with the unmodulated message signal, wherein the ground station is configured to modulate subsequent stator excitation to correct for the Doppler shift based on the comparison.

4. The transportation system of claim 2, wherein the ground station is configured to receive a signal indicative of the speed of the vehicle relative to the stator, wherein the ground station is configured to modulate subsequent stator excitation to correct for the Doppler shift based on the signal indicative of the speed.

5. The transportation system of claim 2, wherein the vehicle is configured to resample the demodulated message signal with an average frequency corresponding to a phase modulated frequency of the stator excitation to correct for the doppler shift of the travelling magnetic field.

6. The transportation system of claim 1, wherein the ground station is configured to modulate the first-phase with the unmodulated message signal by at least one of an amplitude modulation, a frequency modulation, or a shift keying.

7. The transportation system of claim 1, wherein the ground station is configured to modulate the first-phase with the message signal by a transformer or a semiconductor device.

8. The transportation system of claim 1, wherein a frequency of the unmodulated message signal is between 750 Hz and 1000 Hz, wherein a frequency of the demodulated message signal is between 750 Hz and 1000 Hz.

9. The transportation system of claim 1, wherein the vehicle is configured to determine the demodulated message signal corresponding to the unmodulated message signal based on the eddy current by at least one of an analog filter or a digital filter.

10. The transportation system of claim 1, further comprising a secondary rotor disposed along the stator at a fixed distance from the ground station, wherein the secondary rotor is communicatively coupled with the ground station, wherein the travelling magnetic field is configured to induce an eddy current in the secondary rotor, wherein the secondary rotor is configured to communicate a signal indicative of the eddy current induced in the secondary rotor to the ground station.

11. The transportation system of claim 10, wherein the ground station is configured to correct a power factor or a modulation depth of the modulated stator excitation in response to receiving the signal indicative of the eddy current induced in the secondary rotor.

12. The transportation system of claim 1, wherein the ground station is further configured to modulate a second-phase of the three-phase stator excitation with a second message signal for increasing a communication bandwidth to the vehicle.

13. The transportation system of claim 1, further comprising an additional stator, wherein the stator is adjacent to the additional stator, wherein the stator is electrically isolated from the additional stator, wherein the additional stator is configured to generate an additional travelling magnetic field for translating the vehicle and the rotor relative to the additional stator.

14. The transportation system of claim 13, wherein the vehicle is configured to induce an eddy current in the additional stator to repeat the demodulated message signal.

15. The transportation system of claim 13, further comprising an additional ground station, wherein the ground station is communicatively coupled with the additional ground station for inverse multiplexing a portion of the unmodulated message signal between the ground station and the additional ground station, wherein the additional ground station is configured to communicate the inverse multiplexed portion of the unmodulated message signal to the vehicle by the additional stator and the additional travelling wave.

16. A method of communicating from a ground station to a vehicle, the method comprising:

modulating a first-phase of a three-phase stator excitation with an unmodulated message signal to create a modulated stator excitation;

providing the modulated stator excitation to a coil assembly of a stator;

generating, by the coil assembly, a travelling magnetic field in response to receiving the modulated stator excitation;

inducing an eddy current in a rotor coupled to a vehicle in response to the travelling magnetic field, wherein the eddy current corresponds to the modulated stator excitation;

inducing a secondary magnetic field opposing the travelling magnetic field by the eddy current, the secondary magnetic field causing the rotor and the vehicle to translate relative to the stator; and determining a demodulated message signal corresponding to the unmodulated message signal based on the eddy current by at least one of an analog filter or a digital filter.

17. The method of claim 16, further comprising:
correcting for a doppler shift of the travelling magnetic field due to a speed of the vehicle relative to the stator.

18. The method of claim 17, wherein correcting for the doppler shift comprises:
comparing the demodulated message signal with the unmodulated message signal; and
modulating subsequent stator excitation to correct for the doppler shift based on the comparison.

19. The method of claim 17, wherein correcting for the doppler shift comprises:
receiving a signal indicative of the speed of the vehicle relative to the stator; and
modulating subsequent stator excitation to correct for the doppler shift based on the signal indicative of the speed.

20. The method of claim 17, wherein correcting for the doppler shift comprises:
resampling the demodulated message signal with an average frequency corresponding to a phase modulated frequency of the stator excitation to correct for the doppler shift of the travelling magnetic field.

* * * * *